United States Patent
Lyngbäck et al.

(10) Patent No.: US 11,292,700 B2
(45) Date of Patent: Apr. 5, 2022

(54) DRIVER ASSISTANCE SYSTEM AND A METHOD

(71) Applicant: Hiab AB, Kista (SE)

(72) Inventors: Hans Lyngbäck, Hudiksvall (SE); Per Gustafsson, Hudiksvall (SE); Marcus Rösth, Hudiksvall (SE)

(73) Assignee: Hiab AB, Kista (SE)

( * ) Notice: Subject to any disclaimer, the term of this patent is extended or adjusted under 35 U.S.C. 154(b) by 272 days.

(21) Appl. No.: 16/500,547

(22) PCT Filed: Mar. 29, 2018

(86) PCT No.: PCT/SE2018/050343
§ 371 (c)(1),
(2) Date: Oct. 3, 2019

(87) PCT Pub. No.: WO2018/186790
PCT Pub. Date: Oct. 11, 2018

(65) Prior Publication Data
US 2020/0048052 A1 Feb. 13, 2020

(30) Foreign Application Priority Data
Apr. 3, 2017 (SE) .................... 1750410-1

(51) Int. Cl.
*B66C 13/46* (2006.01)
*B66C 15/06* (2006.01)
*G06T 19/00* (2011.01)

(52) U.S. Cl.
CPC .............. *B66C 13/46* (2013.01); *B66C 15/06* (2013.01); *G06T 19/006* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 9,030,332 B2 * | 5/2015 | Tafazoli Bilandi | ....... | E02F 9/24 340/686.1 |
| 9,320,890 B2 | 4/2016 | Vogt et al. | | |
| | (Continued) | | | |

FOREIGN PATENT DOCUMENTS

| | | |
|---|---|---|
| WO | 2011/155749 A2 | 12/2011 |
| WO | 2017/108194 A1 | 6/2017 |

OTHER PUBLICATIONS

International Search Report and Written Opinion for corresponding Patent Application No. PCT/SE2018/050343 dated May 28, 2018.

*Primary Examiner* — Ryan M Gray
(74) *Attorney, Agent, or Firm* — Renner, Otto, Boisselle & Sklar, LLP

(57) ABSTRACT

A driver assistance system (2) for a vehicle (4) provided with a crane (6) for loading or unloading objects (8), the system comprises: a control unit (10) configured to generate a presentation signal (12) to be applied to a display unit (14), an object detecting device (16) configured to capture images of the vehicle and/or of the environment around the vehicle, and configured to generate an image data signal (18) comprising data representing captured images, and to apply said signal (18) to said control unit (10). The control unit (10) is configured to: —determine a three dimensional, 3D, representation of at least one object, being a part of the vehicle and/or being at least one object (8) in the environment around the vehicle, based upon images captured by said object detecting device (16), —determine a 3D representation of the environment around the vehicle, —determine a predetermined alert condition measure related to said determined 3D representations, wherein if said alert condition measure fulfils at least one of a set of predetermined alert (Continued)

criteria, the control unit is configured initiate at least one responsive activity of a set of predetermined responsive activities.

13 Claims, 3 Drawing Sheets

(52) U.S. Cl.
CPC ...... *B66C 2700/08* (2013.01); *G06T 2200/08* (2013.01); *G06T 2207/30252* (2013.01)

(56) References Cited

U.S. PATENT DOCUMENTS

| | | | |
|---|---|---|---|
| 9,415,976 B2 | 8/2016 | Hermann et al. | |
| 2001/0048763 A1* | 12/2001 | Takatsuka | H04N 13/376 |
| | | | 382/154 |
| 2011/0187548 A1 | 8/2011 | Maynard et al. | |
| 2013/0345857 A1* | 12/2013 | Lee | B66C 13/48 |
| | | | 700/229 |
| 2014/0188333 A1* | 7/2014 | Friend | E02F 9/267 |
| | | | 701/34.4 |
| 2015/0249821 A1* | 9/2015 | Tanizumi | B66C 13/00 |
| | | | 348/46 |
| 2016/0193920 A1* | 7/2016 | Tsubone | E02F 9/16 |
| | | | 701/36 |
| 2016/0292918 A1* | 10/2016 | Cummings | G06Q 10/103 |
| 2017/0120822 A1* | 5/2017 | Petzold | B60R 1/002 |
| 2017/0344221 A1* | 11/2017 | Hokkanen | E02F 9/26 |
| 2018/0252921 A1* | 9/2018 | Rantala | G02B 27/017 |
| 2018/0282132 A1* | 10/2018 | Laitasalmi | G06T 7/344 |
| 2020/0250831 A1* | 8/2020 | Ishikawa | B66C 15/065 |

* cited by examiner

DRIVER ASSISTANCE SYSTEM AND A METHOD

TECHNICAL FIELD

The present disclosure relates to a driver assistance system and a method in connection with the system. The driver assistance system is in particular used in a vehicle provided with a crane in assisting the driver during loading and unloading procedures.

BACKGROUND

Working vehicles are often provided with various movable cranes, which are attached to the vehicle via a joint. These cranes comprise movable crane parts, e.g. booms, that may be extended, and that are joined together by joints such that the crane parts may be folded together at the vehicle and extended to reach a load. Various tools, e.g. buckets or forks, may be attached to the crane tip, often via a rotator.

An operator has normally visual control of the crane when performing various tasks. A crane provided with extendible booms often has a large working range which sometimes is required in order to reach loads at remote locations. Today an operator is required to visually inspect a position of a load and the load before e.g. lifting it with a fork. This may sometimes be difficult from a remote location, e.g. when the load is positioned at a location which is not easily accessible, and furthermore, the operator needs sometimes inspect the load by walking around it. Furthermore, the loading/unloading procedure may occur in an environments where very limited space is available when lifting a load. Various obstacles, e.g. edges of buildings and other fixed constructions may thus hinder or obstruct the procedure. These obstacles may sometimes be difficult to identify. All these aspect may altogether lengthen a loading or unloading procedure.

In the prior art there are various examples of using camera systems or other image capturing devices in order to support the user. In the following some prior art documents will be briefly discussed.

U.S. Pat. No. 9,415,976 relates to a to a crane collision avoidance system. A load locator is provided to determine a location of a load of a crane and provide the location information to a mapping module. A tag scanner scans the site for tags, e.g. RFID tags, defining an obstacle. A mapping module combines location information, a map and the obstacle information into a user accessible information that is displayed on a graphical user interface. The tags mark objects on the job site which should be avoided during crane operations.

U.S. Pat. No. 9,302,890 relates to a crane control system configured to intervene with crane movements to avoid a collision with an obstacle. A plurality of plans are stored in a memory for use by a control module, each of the plans representing an overhead plan view of a job site including at least one obstacle therein at a predetermined elevation or elevation range. Furthermore, a plurality of crane configurations are stored in a memory for use by the control module, and a display interface configured to interface with the control module to display via a real-time visualization a selected one of the plurality of plans, a selected one of the crane configuration, and a real-time position of a crane. The system displays directional information of a crane in different directions, and the directional information includes color coding indicating safe, approaching and imminent collision distances to an obstacle. The information is shown at a separate part of a display.

US-2015/0249821 relates to a device for obtaining surrounding information of a vehicle. At an end portion of a telescopic boom of a crane, a stereo camera which measures a distance from the end portion to an object is provided, and an image-processing controller which obtains three-dimensional position information of the object based on the crane as reference from measurement data to the object by the stereo camera is provided. The three-dimensional position information of an object in a surrounding area centering the crane by the moving of the telescopic boom is obtained. In addition it is possible to obtain three-dimensional positional information of buildings in a surrounding area centering on the crane and to make an accurate map. Additionally, the height is shown in color, and therefore, it is possible to recognize the height of the buildings and the hook of the crane visually.

In US-2011/0187548 a lifting device is disclosed to achieve efficient load delivery, load monitoring, collision avoidance, and load hazard avoidance. Various sensors may be provided in a load monitor in a housing close to the load. In particular is discussed collision avoidance and various techniques of generating alarm signals.

The object of the present invention is to achieve an improved system that comprises capabilities of improved assistance and support during the procedure of moving a vehicle and a crane on the vehicle to an appropriate position and then to load/unload on object such that obstacles in the environment of the load is taken into account. A further object is to achieve a driver assistance system having an improved safety when handling loads by a crane.

SUMMARY

The above-mentioned objects are achieved by the present invention according to the independent claims.

Preferred embodiments are set forth in the dependent claims.

According to a first aspect the invention comprises a driver assistance system (2) for a vehicle (4) provided with a crane (6) for loading or unloading objects (8). The system comprises a control unit (10) configured to generate a presentation signal (12) to be applied to a display unit (14), an object detecting device (16) configured to capture images of the vehicle and/or of the environment around the vehicle, and configured to generate an image data signal (18) comprising data representing captured images, and to apply said signal (18) to said control unit (10). The control unit (10) is configured to:

Determine a three dimensional, 3D, representation of at least one object, being a part of the vehicle and/or being at least one object (8) in the environment around the vehicle, based upon images captured by said object detecting device (16).

Determine a 3D representation of the environment around the vehicle.

Determine a predetermined alert condition measure related to said determined 3D representations, wherein if the alert condition measure fulfils at least one of a set of predetermined alert criteria, the control unit is configured initiate at least one responsive activity of a set of predetermined responsive activities.

Thus, the driver assistance system defined herein is advantageous in that it enables detection of various obstacles that may occur during a loading/unloading procedure, and also enables that relevant responsive activities may be applied. In particular in locations where the operator has a limited visual overview.

According to one embodiment the set of responsive activities comprises that the control unit is configured to determine a dynamic augmented reality, AR, image of at least a part of the determined 3D representations. The control unit (10) is then configured to determine, generate and include presentation instructions in the presentation signal (12), and wherein the presentation instructions comprises to present the AR image on said display unit (14) such that said at least a part of said 3D representations in the AR image overlays, corresponds and adapts to the object(s) and environment visible at the display unit (14). This embodiment is advantageous in that the operator will have a real time indication of obstacles at the display unit.

According to another embodiment the presentation instructions comprises image locking parameters that match, relate and lock at least one object in the AR image to the corresponding at least one object visible at the display unit, and that the presentation instructions includes adapting the AR image to crane movements and/or vehicle movements. This is advantageous as the nature and existence of obstacles may vary during a loading/unloading procedure.

According to still another embodiment the control unit is configured to determine an alert value related to an object (e.g. a load, a part of the vehicle, or a part of the environment) in the presented AR image and being a part of the presentation instructions, and wherein the alert value is determined to a value ranging from a low alert value to a high alert value, and wherein said object in the AR image is highlighted in dependence of said determined alert value, such that the highlighting is more intense the higher the alert value is. This is beneficial in that the closer e.g. a crane tip is an obstacle the more important is that an operator is alerted about the situation.

According to still another embodiment the set of responsive activities comprises that the control unit is configured to determine and generate control signals for controlling movements of the crane and/or the vehicle, and in particular for controlling movements of the crane and/or vehicle such that the alert condition measure no longer fulfils any of the predetermined alert criteria. This embodiment is specifically applicable in vehicles where loading/unloading procedures are fully or at least partly automatically performed.

According to another embodiment the set of responsive activities comprises that the control unit is configured to determine and generate control signals (20) for controlling movements of the crane, and wherein said control signals include a stop signal command to stop the movement of the crane. This is advantageous in that a potentially dangerous situation instantly may be avoided.

According to a further embodiment the set of responsive activities comprises that the control unit is configured to determine and generate alert signals (22) being one or many of an audible, visible, and tactile signal. The operator is thereby alerted and may take appropriate action.

According to still a further embodiment the predetermined alert condition measure is related to a distance between a part of said crane and/or vehicle and an object. Furthermore, the set of predetermined alert criteria includes different distances between the part of said crane and/or vehicle, and the object.

According to another embodiment the control unit (10) is configured to determine the 3D representation of the environment around the vehicle based upon images captured by the object detecting device (16), and/or based upon image information received from an external source. It may be beneficial to apply image information from external sources, e.g. so-called GIS-data or information from other vehicles, as a very detailed representations thereby may be obtained.

According to still another embodiment the object detecting device (10) is a camera system comprising two cameras that have essentially overlapping field of views. Using a camera system is advantageous in that it is a passive system, and that the camera system also may be applied to take pictures of the object and of the environment.

According to another embodiment the display unit (22) is a pair of glasses structured to present the AR image such that the AR image is overlaid on the transparent glasses through which a user observes the object and/or the environment, and according to a further embodiment the display unit (22) is a pair of virtual reality goggles.

These embodiments are advantageous as the operator will have a clear overview of a particular location of interest and that obstacles may be highlighted and indicated by the overlaid AR image.

According to a second aspect the invention comprises a method in a driver assistance system (2) for a vehicle (4) provided with a crane (6) for loading or unloading objects (8). The method comprises the steps of generating a presentation signal (12), by a control unit (10), applying the presentation signal to a display unit (14), capturing images, by an object detecting device (16), of the vehicle and/or of the environment around the vehicle, generating an image data signal (18) comprising data representing captured images, and applying said signal (18) to said control unit (10). The method further comprises to:

determining a three dimensional, 3D, representation of at least one object, being a part of the vehicle and/or being at least one object (8) in the environment around the vehicle, based upon images captured by said object detecting device (16), determining a 3D representation of the environment around the vehicle, determining a predetermined alert condition measure related to said determined 3D representations, wherein if said alert condition measure fulfils at least one of a set of predetermined alert criteria, initiating at least one responsive activity of a set of predetermined responsive activities.

DETAILED DESCRIPTION

The driver assistance system, and the method, will now be described in detail with references to the appended figures. Throughout the figures the same, or similar, items have the same reference signs. Moreover, the items and the figures are not necessarily to scale, emphasis instead being placed upon illustrating the principles of the invention.

Figure 1:
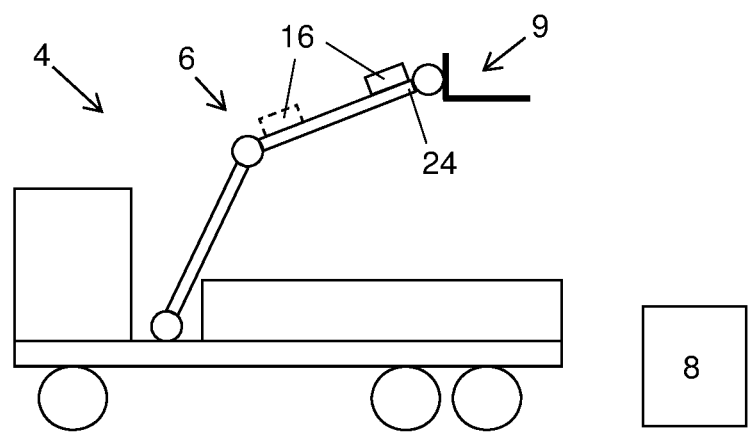
FIG. 1 is a schematic illustration of a vehicle provided with a driver assistance system according to the present invention.
Figure 2:
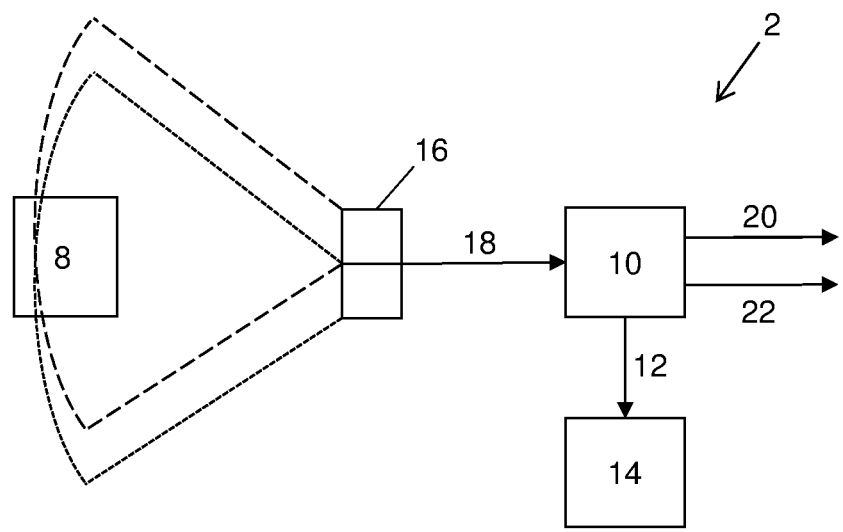
FIG. 2 is a block diagram schematically illustrating the driver assistance system according to the present invention.
Figure 3:
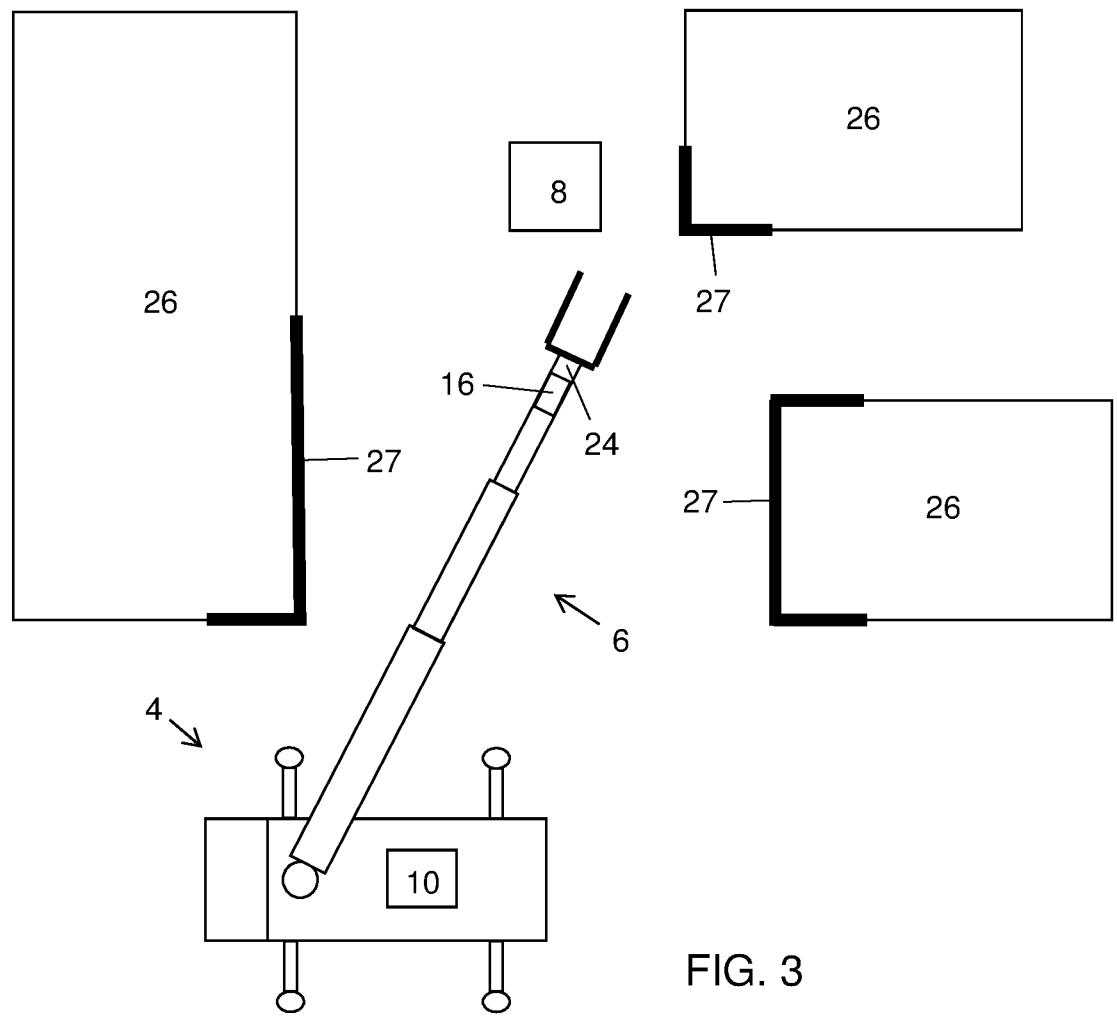
FIG. 3 is a view from above showing a vehicle operating in an environment and applying one embodiment of the system according to the present invention.

With references to FIGS. 1-4, a driver assistance system 2 for a vehicle 4 will be described. The vehicle is preferably provided with a crane 6 for loading or unloading objects 8, using e.g. a fork 9 which is illustrated in FIGS. 1 and 3.

The system comprises a control unit 10 configured to generate a presentation signal 12 to be applied to a display unit 14. The presentation signal comprises presentation instructions related to presentation of information on the display unit.

The system further comprises an object detecting device 16 configured to capture images of the vehicle and/or of the environment around the vehicle, and configured to generate an image data signal 18 comprising data representing captured images, and to apply said signal 18 to said control unit 10. In one advantageous embodiment the object detecting device 16 is a camera system which will be described below. Other types of object detecting devices will also be described. The object detecting device may be structured to capture images in a wide angle, e.g. in some devices 360 degrees around the device.

The control unit 10 is configured to determine a three dimensional, 3D, representation of at least one object, being a part of the vehicle and/or being at least one object 8 in the environment around the vehicle, based upon images captured by the object detecting device 16, and to determine a 3D representation of the environment around the vehicle. Below, in the description of different applicable object detecting devices, it will be described various techniques for determining the 3D representation.

The 3D representation of the environment around the vehicle is based upon images captured by the object detecting device 16, and/or based upon image information received from an external source. The image information may e.g. be based upon geographic information system (GIS) data which is a system designed to capture, store, manipulate, analyse, manage, and present spatial or geographic data. GIS-data, or other available data, includes data representations of buildings and other fixed constructions such as bridges.

Preferably, the determined 3D representations includes a tip 24 of the crane and at least one fixed construction 26 (see FIGS. 3 and 4), e.g. a building, in the environment, and may also include 3D representations of an object 8, e.g. a load, to be loaded or unloaded by the crane.

The control unit is further configured to determine a predetermined alert condition measure related to the determined 3D representations.

In one embodiment the alert condition measure is related to a distance between a part of the crane and/or the vehicle and an object, and the set of predetermined alert criteria includes different distances between the part of the crane and/or vehicle, and the object. The alert condition measure may also be related to the movement of the crane where the object detecting device is mounted in relation to an object in the environment, and may then be related to the velocity or the acceleration.

The alert condition measure is compared to the set of alert criteria, which in one embodiment includes comparing it to a distance between the crane tip and a building, e.g. a corner of the building. In a variation the measure instead is a velocity or an acceleration and in that case it is instead compared to one or many velocity or acceleration thresholds. It may also be applicable to use combined alert condition measures, e.g. a distance in combination with a velocity.

If the alert condition measure fulfils at least one alert criterion of a set of predetermined alert criteria, e.g. if the distance between the crane tip and the corner of the building is too short, then the control unit is configured initiate at least one responsive activity of a set of predetermined responsive activities.

The set of responsive activities includes:
Determining a dynamic augmented (AR) image of at least a part of the determined 3D representation and present the AR image overlaid on the real time image presented at the display unit.
Controlling the movement of the crane and/or the vehicle in order to avoid the situation, e.g. the situation that caused an alert criterion to be fulfilled.
Generating an alert signal to make the driver aware of the situation.

These responsive activities will be discussed in detail below.

According to one embodiment the set of responsive activities comprises that the control unit is configured to determine a dynamic augmented reality, AR, image of at least a part of the determined 3D representations.

The control unit 10 then is configured to determine, generate and include presentation instructions in the presentation signal 12, and that the presentation instructions comprises to present the AR image on the display unit 14 such that the at least a part of the 3D representations in the AR image overlays, corresponds and adapts to the object(s) and environment visible at the display unit 14. The at least a part of the 3D representations may be an edge, a corner, or a part of a wall of a building, a lamp-post, or any other fixed construction. More specifically, the presentation instructions comprises image locking parameters that match, relate and lock at least one object in the AR image to the corresponding at least one object visible at the display unit. This is e.g. performed by applying a pattern recognition algorithm to recognize e.g. a particular part of a building and to keep track on that particular part even when the crane and/or the vehicle moves. Thus, the presentation instructions includes adapting the AR image to crane movements and/or vehicle movements.

Figure 4:
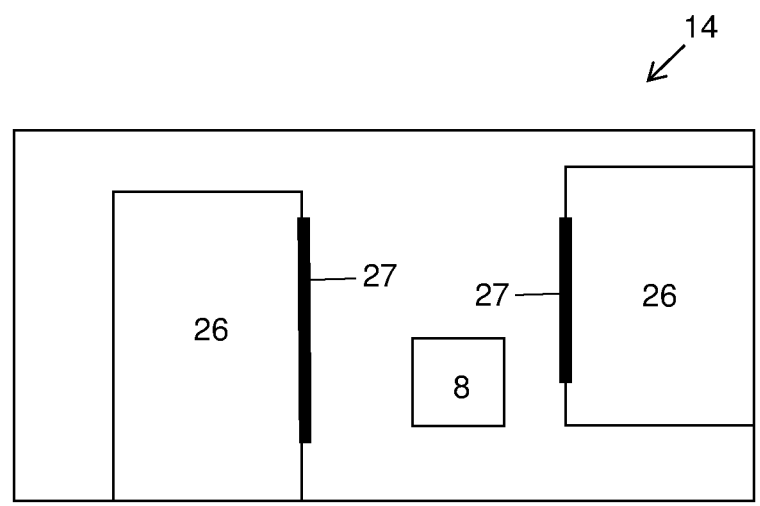
FIG. 4 shows a schematic illustration of a display unit showing images of the environment and load according to one embodiment of the system according to the present invention.

This embodiment also comprises that the control unit is configured to determine an alert value related to an object in the presented AR image and being a part of the presentation instructions. The alert value is determined to a value ranging from a low alert value to a high alert value, and wherein the object in the AR image is highlighted in dependence of the determined alert value, such that the highlighting is more intense the higher the alert value is. This results in that e.g. an edge being close to and within the movement range of the crane is highlighted by for example a distinct colour, e.g. red, at the display unit. In FIGS. 3 and 4 the highlighted portions 27 of objects are indicated by bold lines.

According to another embodiment the set of responsive activities comprises that the control unit is configured to determine and generate control signals 20 for controlling movements of the crane and/or the vehicle. More specifically, the control unit is configured to determine control signals 20 for controlling movements of the crane and/or vehicle such that the alert condition measure no longer fulfils any of said predetermined alert criteria. These control signals may be automatically generated and may result in that the crane or vehicle is moved such that the crane tip is moved away from e.g. an edge of a building. In another variation the control signals are adapted to control a loading, or unloading, procedure, e.g. moving a crane tip provided with a tool to an object, for example a bin, attaching the tool to the bin and then moving the bin to a position where it may be emptied. And then returning the bin to its initial position and releasing it from the tool. In still another variation the control signals are adapted to control movement of a crane provided with a fork at the crane tip to a position where the fork may be used to lift an object, e.g. a pallet. In a further example the tool at the crane tip is a hook that is used for lifting an object. In that case the crane may be controlled to move the hook to a proper position for attaching it to an object. This embodiment also comprises that the set of responsive activities comprises that the control unit is configured to determine and generate control signals 20 for controlling movements of the crane, such that they include a stop signal command to stop the movement of the crane.

According to still another embodiment the set of responsive activities comprises that the control unit is configured to determine and generate alert signals 22 being one or many of an audible, visible, and tactile signal. The alert signal may be generated in combination with e.g. presenting an AR image and/or controlling the movement of the crane.

The object detecting device 16 may be embodied in many different ways using various technologies. In the following some of these will be discussed in detail.

A camera system comprises at least two cameras, preferably two cameras, sometimes called a stereo camera where the two cameras having overlapping field of view. This is an advantageous embodiment of the object detecting device as stereo camera systems are more and more frequently used in various vehicles.

A stereo camera is a type of camera with two lenses with a separate image sensor for each lens. This allows the camera to simulate human binocular vision, and therefore gives it the ability to capture three-dimensional images, a process known as stereo photography. Stereo cameras may be used for making 3D pictures, or for range imaging. Unlike most other approaches to depth sensing, such as structured light or time-of-flight measurements, stereo vision is a purely passive technology which also works in bright daylight.

In another embodiment the object detecting device uses the Lidar-technology. Lidar is sometimes considered an acronym of Light Detection And Ranging (sometimes Light Imaging, Detection, And Ranging), and is a surveying method that measures distance to a target by illuminating that target with a laser light. Lidar is popularly used to make high-resolution maps, with applications in geodesy, forestry, laser guidance, airborne laser swath mapping (ALSM), and laser altimetry. Lidar sometimes is called laser scanning and 3D scanning, with terrestrial, airborne, and mobile applications.

In still another embodiment a 3D scanning device is used. A 3D scanner is a device that analyses a real-world object or environment to collect data on its shape and possibly its appearance (e.g. colour). The collected data can then be used to construct digital three-dimensional models.

Many different technologies can be used to build these 3D-scanning devices; each technology comes with its own limitations, advantages and costs. Many limitations in the kind of objects that can be digitised are still present, for example, optical technologies encounter many difficulties with shiny, mirroring or transparent objects. For example, industrial computed tomography scanning can be used to construct digital 3D models, applying non-destructive testing. The purpose of a 3D scanner is usually to create a point cloud of geometric samples on the surface of the subject. These points can then be used to extrapolate the shape of the subject (a process called reconstruction). If colour information is collected at each point, then the colours on the surface of the subject can also be determined.

3D scanners share several traits with cameras. Like most cameras, they have a cone-like field of view, and like cameras, they can only collect information about surfaces that are not obscured. While a camera collects colour information about surfaces within its field of view, a 3D scanner collects distance information about surfaces within its field of view. The "picture" produced by a 3D scanner describes the distance to a surface at each point in the picture. This allows the three dimensional position of each point in the picture to be identified.

In still another embodiment a so-called time-of-flight lidar scanner may be used to produce a 3D model. The lidar can aim its laser beam in a wide range: its head rotates horizontally, a mirror flips vertically. The laser beam is used to measure the distance to the first object on its path.

The time-of-flight 3D laser scanner is an active scanner that uses laser light to probe the subject. At the heart of this type of scanner is a time-of-flight laser range finder. The laser range finder finds the distance of a surface by timing the round-trip time of a pulse of light. A laser is used to emit a pulse of light and the amount of time before the reflected light is seen by a detector is measured. Since the speed of light c is known, the round-trip time determines the travel distance of the light, which is twice the distance between the scanner and the surface. The accuracy of a time-of-flight 3D laser scanner depends on how precisely we can measure the t; 3.3 picoseconds (approx.) is the time taken for light to travel 1 millimetre.

The laser range finder only detects the distance of one point in its direction of view. Thus, the scanner scans its entire field of view one point at a time by changing the range finder's direction of view to scan different points. The view direction of the laser range finder can be changed either by rotating the range finder itself, or by using a system of rotating mirrors. The latter method is commonly used because mirrors are much lighter and can thus be rotated much faster and with greater accuracy. Typical time-of-flight 3D laser scanners can measure the distance of 10,000-100,000 points every second.

In another embodiment the object detecting device uses a structured-light 3D scanner that projects a pattern of light on the subject and look at the deformation of the pattern on the subject. The pattern is projected onto the subject using either an LCD projector or other stable light source. A camera, offset slightly from the pattern projector, looks at the shape of the pattern and calculates the distance of every point in the field of view.

The advantage of structured-light 3D scanners is speed and precision. Instead of scanning one point at a time, structured light scanners scan multiple points or the entire field of view at once. Scanning an entire field of view in a fraction of a second reduces or eliminates the problem of distortion from motion. Some existing systems are capable of scanning moving objects in real-time.

According to one embodiment the control unit 10 is configured to generate and apply a presentation signal 12 to the display unit 14 to present the 3D representation on the display unit.

The display unit may be a display arranged e.g. at a control unit or in the vehicle. As an alternative the display unit 14 is a pair of glasses, for example of the type sold under the trademark Hololens. The pair of glasses is structured to present the 3D representation such that the 3D representation is overlaid on the transparent glasses through which a user observes the object. Various additional information may also be presented as overlaid information and preferably presented such that the additional information is presented close to an illustrated part of the object.

In still another embodiment the display unit 14 is a pair of virtual reality goggles. These types of goggles comprise two displays to be arranged in front of the operator's eyes. This embodiment is particularly advantageous when the operator has no direct line of sight to an object to be handled. Often VR goggles are provided with an orientation sensor that senses the orientation of the VR goggles. It may then be possible for a user to change the field of view to locate potential obstacles close to the load, provided that the object detecting device has a larger field of vision than the image presented at the displays of the VR goggles.

The present invention also relates to a method in a driver assistance system 2 for a vehicle 4 provided with a crane 6 for loading or unloading objects 8. For a detailed description of the driver assistance system it is referred to the above description and to FIGS. 1-4.

Figure 5:
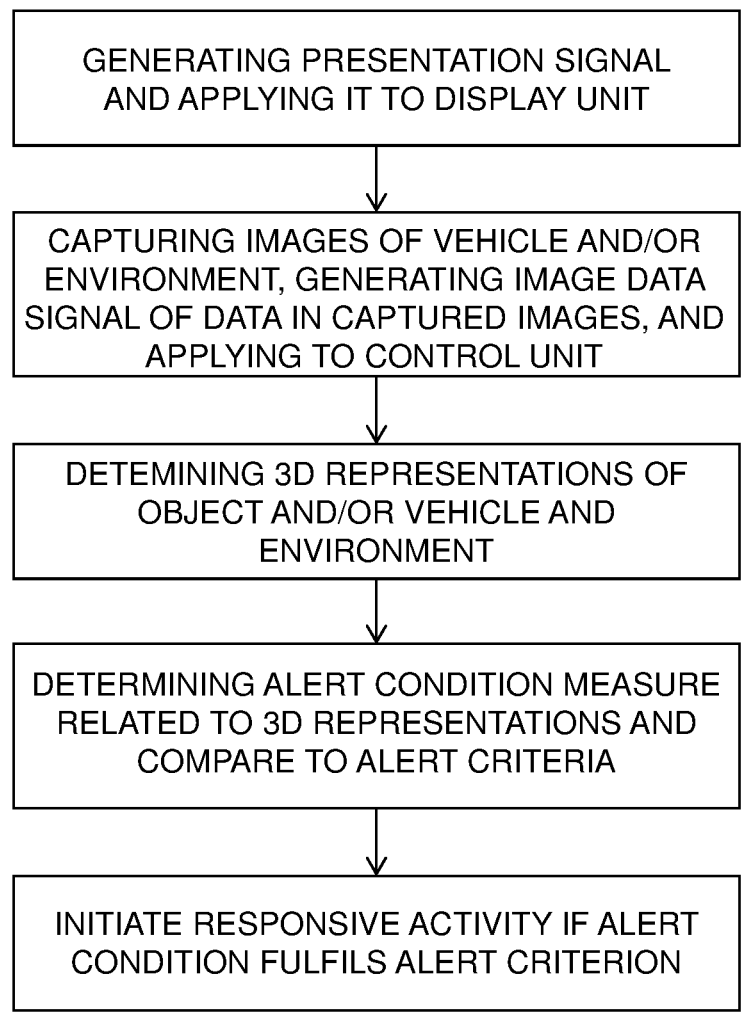
FIG. 5 is a flow diagram illustrating the method according to the present invention.

The method will be described with references to the flow diagram shown in FIG. 5, and comprises:

Generating a presentation signal 12, by a control unit 10, and applying the presentation signal to a display unit 14.

Capturing images, by an object detecting device 16, of the vehicle and/or of the environment around the vehicle, generating an image data signal 18 comprising data representing captured images, and applying the signal 18 to the control unit 10.

The method further comprises:

Determining a three dimensional, 3D, representation of at least one object, being a part of the vehicle and/or being at least one object 8 in the environment around the vehicle, based upon images captured by said object detecting device 16.

Determining a 3D representation of the environment around the vehicle.

Determining a predetermined alert condition measure related to the determined 3D representations, wherein if the alert condition measure fulfils at least one of a set of predetermined alert criteria, initiating at least one responsive activity of a set of predetermined responsive activities.

In one embodiment the set of responsive activities comprises that the method further comprises:

Determining a dynamic augmented reality, AR, image of at least a part of the determined 3D representations.

Determining, generating and including presentation instructions in the presentation signal 12, and wherein the presentation instructions comprises presenting the AR image on the display unit 14 such that the at least a part of the 3D representations in the AR image overlays, corresponds and adapts to the object(s) and environment visible at the display unit 14.

Preferably, the presentation instructions comprises image locking parameters that match, relate and lock at least one object in the AR image to the corresponding at least one object visible at the display unit, and that the presentation instructions includes adapting the AR image to crane movements and/or vehicle movements. In one variation the method comprises determining an alert value related to an object in the presented AR image and being a part of said presentation instructions. The alert value is determined to a value ranging from a low alert value to a high alert value, and wherein the object in the AR image is highlighted in dependence of the determined alert value, such that the highlighting is more intense the higher the alert value is.

In another embodiment the set of responsive activities comprises that the method comprises determining and generating control signals for controlling movements of the crane and/or the vehicle, and in particular controlling movements of the crane and/or vehicle such that the alert condition measure no longer fulfils any of the predetermined alert criteria.

Preferably, the method further comprises that the set of responsive activities comprises determining and generating control signals (20) for controlling movements of the crane, and wherein the control signals include a stop signal command to stop the movement of the crane.

In another variation the set of responsive activities comprises determining and generating alert signals 22 being one or many of an audible, visible, and tactile signal.

In still another variation, the method comprises that the predetermined alert condition measure is preferably related to a distance between a part of the crane and/or vehicle and an object, and wherein the set of predetermined alert criteria includes different distances between the part of said crane and/or vehicle, and the object.

The method further comprises the variation providing a display unit (22) being a pair of glasses, and presenting the AR image such that the AR image is overlaid on the transparent glasses through which a user observes the object and/or the environment.

And in still another variation the method comprises presenting the AR image at the display unit 22 being a pair of virtual reality goggles.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A driver assistance system for a vehicle provided with a crane for loading or unloading objects, the system comprises:
    a control unit configured to generate a presentation signal to be applied to a display unit,
    an object detecting device configured to capture images of the vehicle and/or of the environment around the vehicle, and configured to generate an image data signal comprising data representing captured images, and to apply said signal to said control unit, and that the control unit is configured to:
    determine a three dimensional, 3D, representation of at least one object, being a part of the vehicle and/or being at least one object in the environment around the vehicle, based upon images captured by said object detecting device,
    determine a 3D representation of the environment around the vehicle, and
    determine a predetermined alert condition measure related to said determined 3D representations, wherein if said alert condition measure fulfils at least one of a set of predetermined alert criteria, the control unit is configured to initiate at least one responsive activity of a set of predetermined responsive activities, and
    wherein said set of responsive activities comprises that the control unit is configured to determine a dynamic augmented reality, AR, image, including highlighted portions, of at least a part of said determined 3D representations, wherein the control unit is configured to determine, generate and include presentation instructions in said presentation signal, and wherein said presentation instructions comprises to present said AR image on said display unit such that said at least a part of said 3D representations in the AR image overlays, corresponds and adapts to the object(s) and environment visible at the display unit;

wherein said presentation instructions comprises image locking parameters that match, relate and lock at least one object in the AR image to the corresponding at least one object visible at the display unit;

wherein said presentation instructions includes adapting the AR image to crane movements and/or vehicle movements.

2. The driver assistance system according to claim 1, wherein the control unit is configured to determine an alert value related to an object in said presented AR image and being a part of said presentation instructions, and wherein the alert value is determined to a value ranging from a low alert value to a high alert value, and wherein said object in the AR image is highlighted in dependence of said determined alert value, such that the highlighting is more intense the higher the alert value is.

3. The driver assistance system according to claim 1, wherein said set of responsive activities comprises that the control unit is configured to determine and generate control signals for controlling movements of the crane and/or the vehicle.

4. The driver assistance system according to claim 3, wherein said control unit is configured to determine control signals for controlling movements of the crane and/or vehicle such that said alert condition measure no longer fulfils any of said predetermined alert criteria.

5. The driver assistance system according to claim 1, wherein said set of responsive activities comprises that the control unit is configured to determine and generate control signals for controlling movements of the crane, and wherein said control signals include a stop signal command to stop the movement of the crane.

6. The driver assistance system according to claim 1, wherein said set of responsive activities comprises that the control unit is configured to determine and generate alert signals being one or many of an audible, visible, and tactile signal.

7. The driver assistance system according to claim 1, wherein said predetermined alert condition measure is related to a distance between a part of said crane and/or vehicle and an object, and wherein said set of predetermined alert criteria includes different distances between the part of said crane and/or vehicle, and the object.

8. The driver assistance system according to claim 1, wherein said control unit is configured to determine said 3D representation of the environment around the vehicle based upon images captured by said object detecting device, and/or based upon image information received from an external source.

9. The driver assistance system according to claim 1, wherein said object detecting device is a camera system comprising two cameras that have essentially overlapping field of views.

10. The driver assistance system according to claim 1, wherein said display unit is a pair of glasses structured to present the AR image such that the AR image is overlaid on the transparent glasses through which a user observes the object and/or the environment.

11. The driver assistance system according to claim 1, wherein said display unit is a pair of virtual reality goggles.

12. A method in a driver assistance system for a vehicle provided with a crane for loading or unloading objects, the method comprises:

generating a presentation signal, by a control unit, applying the presentation signal to a display unit, capturing images, by an object detecting device, of the vehicle and/or of the environment around the vehicle, generating an image data signal comprising data representing captured images, applying said signal to said control unit, determining a three dimensional, 3D, representation of at least one object, being a part of the vehicle and/or being at least one object in the environment around the vehicle, based upon images captured by said object detecting device, determining a 3D representation of the environment around the vehicle, determining a predetermined alert condition measure related to said determined 3D representations, wherein if said alert condition measure fulfils at least one of a set of predetermined alert criteria, initiating at least one responsive activity of a set of predetermined responsive activities, and wherein said set of responsive activities comprises that the method further comprises:

determining a dynamic augmented reality, AR, image, including highlighted portions, of at least a part of said determined 3D representations, determining, generating and including presentation instructions in said presentation signal, and wherein said presentation instructions comprises presenting said AR image on said display unit such that said at least a part of said 3D representations in the AR image overlays, corresponds and adapts to the object(s) and environment visible at the display unit;

wherein said presentation instructions comprises image locking parameters that match, relate and lock at least one object in the AR image to the corresponding at least one object visible at the display unit;

wherein said presentation instructions includes adapting the AR image to crane movements and/or vehicle movements.

13. The method according to claim 12, wherein said set of responsive activities comprises that the method comprises determining and generating control signals for controlling movements of the crane and/or the vehicle.

* * * * *